(12) United States Patent
Park

(10) Patent No.: US 8,013,948 B2
(45) Date of Patent: Sep. 6, 2011

(54) LIQUID CRYSTAL DISPLAY DEVICE HAVING LIGHT EMITTING DIODE PRINTED CIRCUIT BOARD RECESSED WITHIN THE BOTTOM COVER

(75) Inventor: Hee-Jeong Park, Bucheon-si (KR)

(73) Assignee: LG Display Co., Ltd., Seoul (KR)

( * ) Notice: Subject to any disclaimer, the term of this patent is extended or adjusted under 35 U.S.C. 154(b) by 561 days.

(21) Appl. No.: 11/288,937

(22) Filed: Nov. 15, 2005

(65) Prior Publication Data

US 2006/0103776 A1 May 18, 2006

(30) Foreign Application Priority Data

Nov. 16, 2004 (KR) .......................... 10-2004-0093420

(51) Int. Cl.
G02F 1/1333 (2006.01)
G02F 1/1335 (2006.01)
F21V 7/04 (2006.01)

(52) U.S. Cl. ............. 349/58; 349/69; 362/632; 362/633; 362/634

(58) Field of Classification Search ............... 349/58–71; 361/681; 362/31, 600–634; 385/146, 901
See application file for complete search history.

(56) References Cited

U.S. PATENT DOCUMENTS

| 4,042,861 | A | * | 8/1977 | Yasuda et al. | 361/783 |
|---|---|---|---|---|---|
| 5,453,855 | A | * | 9/1995 | Nakamura et al. | 349/58 |
| 6,181,390 | B1 | * | 1/2001 | Wang et al. | 349/58 |
| 6,961,103 | B2 | * | 11/2005 | Sung et al. | 349/58 |
| 7,104,671 | B2 | * | 9/2006 | Tseng et al. | 362/224 |
| 2005/0140849 | A1 | * | 6/2005 | Hoelen et al. | 349/65 |
| 2005/0265029 | A1 | * | 12/2005 | Epstein et al. | 362/339 |
| 2005/0281050 | A1 | * | 12/2005 | Chou | 362/612 |
| 2005/0286264 | A1 | * | 12/2005 | Kim et al. | 362/600 |

* cited by examiner

Primary Examiner — Jessica M Merlin
(74) Attorney, Agent, or Firm — Brinks Hofer Gilson & Lione

(57) ABSTRACT

A liquid crystal display device includes a liquid crystal display panel, a printed circuit board with a bottom side surface and at least two side surfaces positioned under the liquid crystal display panel and a light emitting diode positioned on an inner surface of the printed circuit board. The liquid display device additionally includes a bottom cover positioned under the printed circuit board with a recessed portion under the printed circuit board wherein the bottom side surface and the two side surfaces of the printed circuit board contact the bottom cover.

20 Claims, 5 Drawing Sheets

LIQUID CRYSTAL DISPLAY DEVICE HAVING LIGHT EMITTING DIODE PRINTED CIRCUIT BOARD RECESSED WITHIN THE BOTTOM COVER

The present invention claims the benefit of Korean Patent Application No. 2004-0093420, filed in Korea on Nov. 16, 2004, which is hereby incorporated by reference.

BACKGROUND OF THE INVENTION

1. Field of the Invention

The present invention relates to a liquid crystal display (LCD) device, more particularly, an LCD module using a light emitting diode (LED).

2. Discussion of the Related Art

Flat panel display (FPD) devices that have a relatively light weight, a thin profile, and low power consumption characteristics are being developed and commonly used as a substitute for cathode ray tube (CRT) devices. Generally, display devices may be classified according to their ability for self-emission, and may include emissive display devices and non-emissive display devices. Emissive display devices display images by taking advantage of their ability to self-emit light, while the non-emissive display devices require a light source since they do not emit light by themselves. For example, plasma display panel (PDP) devices, field emission display (FED) devices, and electroluminescent display (ELD) devices are commonly used as emissive display devices. Liquid crystal display (LCD) devices may be categorized as non-emissive display devices commonly used in notebook and desktop computers because of their high resolution, capability of displaying colored images, and high quality image display.

An LCD module of the LCD devices include an LCD panel for displaying images to an exterior and a backlight unit for supplying light to the LCD panel. The LCD panel includes two substrates facing and spaced apart from each other, and a liquid crystal material interposed therebetween. Liquid crystal molecules of the liquid crystal material have a dielectric constant and refractive index anisotropic characteristics due to their long, thin shape. In addition, two electric field generating electrodes are formed on the two substrates, respectively. Accordingly, an orientation alignment of the liquid crystal molecules can be controlled by supplying a voltage to the two electrodes, wherein transmittance of the LCD panel is changed according to polarization properties of the liquid crystal material. However, since the LCD panel is a non-emissive-type display device, an additional light source is required. Thus, a backlight unit is disposed under the LCD panel, wherein the LCD device displays images using light produced by the backlight unit. In general, backlight units may be classified into two types according to a disposition of the light source, such as side-type backlight unit and direct-type backlight unit. As display areas of the LCD devices become larger, direct-type backlight units including a plurality of light sources have become more commonly used in order to provide increased brightness.

Generally, discharge lamps, such as a cold cathode fluorescent lamps (CCFL) or external electrode fluorescent lamps (EEFL), are used as a light source of the backlight unit. Additionally, a light emitting diode (LED) are gradually being used more often as the light source of the backlight unit to improve color reproducibility to increase brightness of the display.

FIG. 1 is an assembly view of an LCD module using an LED according to the related art. An LCD panel 10 and a backlight unit 20 are assembled with mechanical structural elements to protect these components and to prevent light leakage from the assembled LCD module 1. Generally, the LCD panel 10, the backlight unit 20, and several mechanical elements may be totally referred an LCD module 1.

The LCD module 1 includes an LCD panel 10, a backlight unit 20 located under the LCD panel 10, a main support bracket 40, which is preferably square or rectangular, surrounds the edges of the LCD panel 10 and the backlight unit 20. Additionally, a bottom cover 50 is provided on a bottom surface of the backlight unit 20 to provide structural support and to prevent light leakage from the unit from which is combined with the main support bracket 40. Furthermore, a top cover 60 surrounds a front edge of the LCD panel 10, the LCD module 1 is totally assembled and combined by the main support bracket 40, the bottom cover 50, and the top cover 60.

Gate and data driving circuit boards 14, 16 are disposed along at least one edge of the LCD panel 10, which generate signal voltages for controlling an image on the LCD panel 10. In some embodiments, the gate and data driving circuit boards 14, 16 are bent toward the backside of the bottom cover 50.

In addition, the backlight unit 20 further includes a plurality of printed circuit boards 22 are disposed along an inner surface of the bottom cover 50, a plurality of light emitting diodes (LEDs) 24 packaged on the printed circuit boards 22, a reflective sheet 28 having a plurality of open portions 30 corresponding to the plurality of LEDs 24 and contacting the printed circuit boards 22 and the bottom cover 50 except the LEDs 24, and a plurality of optical sheets 32 covering the plurality of LEDs 24 with the reflective sheet 28 therebetween.

Accordingly, light from the plurality of LEDs 24 is reflected directly or by the reflective sheet 28, and then the reflected light is altered during passing the plurality of optical sheets 32. The altered light is transmitted to the LCD panel 10, which allows the LCD panel 10 to display a bright image.

However, this LCD module 1 according to the related art has a several problems, including the relatively large required thickness of the unit, which prevents the unit from being as thin as possible.

FIG. 2 is a schematic cross sectional view taken along a line II-II of FIG. 1 according to the related art. A plurality of LEDs 24 are packaged with the printed circuit board 22. The printed circuit board 22 is disposed on an inner surface of a bottom cover 50 and reflective sheet 28 having a plurality of open portions 30 covers the printed circuit board 22 and the bottom cover 50 except for the LEDs 24. Each of the LEDs 24 are exposed by each of the respective open portions 30. Furthermore, a plurality of open portions 30 are disposed on the reflective sheet 28.

In the related art, a metal core type printed circuit board are often used as printed circuit boards 22. Metal core type printed circuit boards often emit significant amount of heat because the inner temperature of the LED increases when brightness of the LED is increased. Although the LED emits more heat, the internal temperature also increases which reduces brightness of the LED.

FIG. 3 is a graphic view illustrating a brightness relationship between a junction temperature and brightness of an LED according to the related art.

As discussed above, the greater the junction temperature of the LED is increased, the more the output brightness is reduced. For example, when the junction temperature is more than 80 degrees Celsius (° C.), the brightness is reduced less to 80 percent. Accordingly, the printed circuit board may be manufactured with an Aluminum core (Al), which is a material relatively a high thermal conductivity, and a relatively low resistance. The plurality of LEDs are preferably positioned along one edge of the printed circuit board, and another edge of the printed circuit board is closely adhered to the inner flat surface of the bottom cover using a conductive adhesives or a screw.

As a result, the printed circuit board except the LED and the reflective sheet covering a portion of the bottom cover have a first distance A with the inner surface of the bottom cover, wherein the first space A corresponds to a height of the printed circuit board and the conductive adhesives.

Additionally, the plurality of optical sheets is interposed between the reflective sheet and the LCD panel, wherein the optical sheets converts light emitted from the LED into a uniform plan light and transmits light to the LCD panel to improve the brightness of the panel. Specifically, the optical sheets include a diffusion sheet directly disposed on the LED and a plurality prism sheets spaced apart from the diffusion sheet.

Accordingly, a second distance K corresponds to a space from the inner surface of the bottom cover to the outer surface of the outermost prism sheet toward the LCD panel. The second distance K includes the space A between bottom cover and the inner surface of the reflective sheet facing the bottom cover and a third distance B that extends from the outer surface of the reflective sheet to the outer surface of the approximate prism sheet.

Here, the LCD module using the LED according to the related art must include the first distance A and the third distance B, so it is difficult significantly to reduce the second distance K. Furthermore, the combination process for the printed circuit board and the bottom cover using the conductive adhesives or the screw has a complicated problem.

SUMMARY OF THE INVENTION

A liquid crystal display device includes a liquid crystal display panel and a main support bracket surrounding an edge of the liquid crystal display panel. A printed circuit board is provided under the liquid crystal display panel and a light emitting diode is located on an inner surface of the printed circuit board. A bottom cover is assembled under the printed circuit board that includes recess portion in which the printed circuit board and the light emitting diode are inserted to expose the light emitting diode. A top cover surrounds a front edge of the liquid crystal display panel. The top cover, the support main and the bottom cover are connected with each other and at least three sides of the printed circuit board contact that of the bottom cover.

It is to be understood that both the foregoing general description and the following detailed description are exemplary and explanatory and are intended to provide further explanation of the invention as claimed. Additional features and advantages of the invention will be set forth in the description which follows and will be apparent from the description or may be learned by practice of the invention.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION

Reference will now be made in detail to the preferred embodiments of the present invention, examples of which are illustrated in the accompanying drawings.

Figure 1:
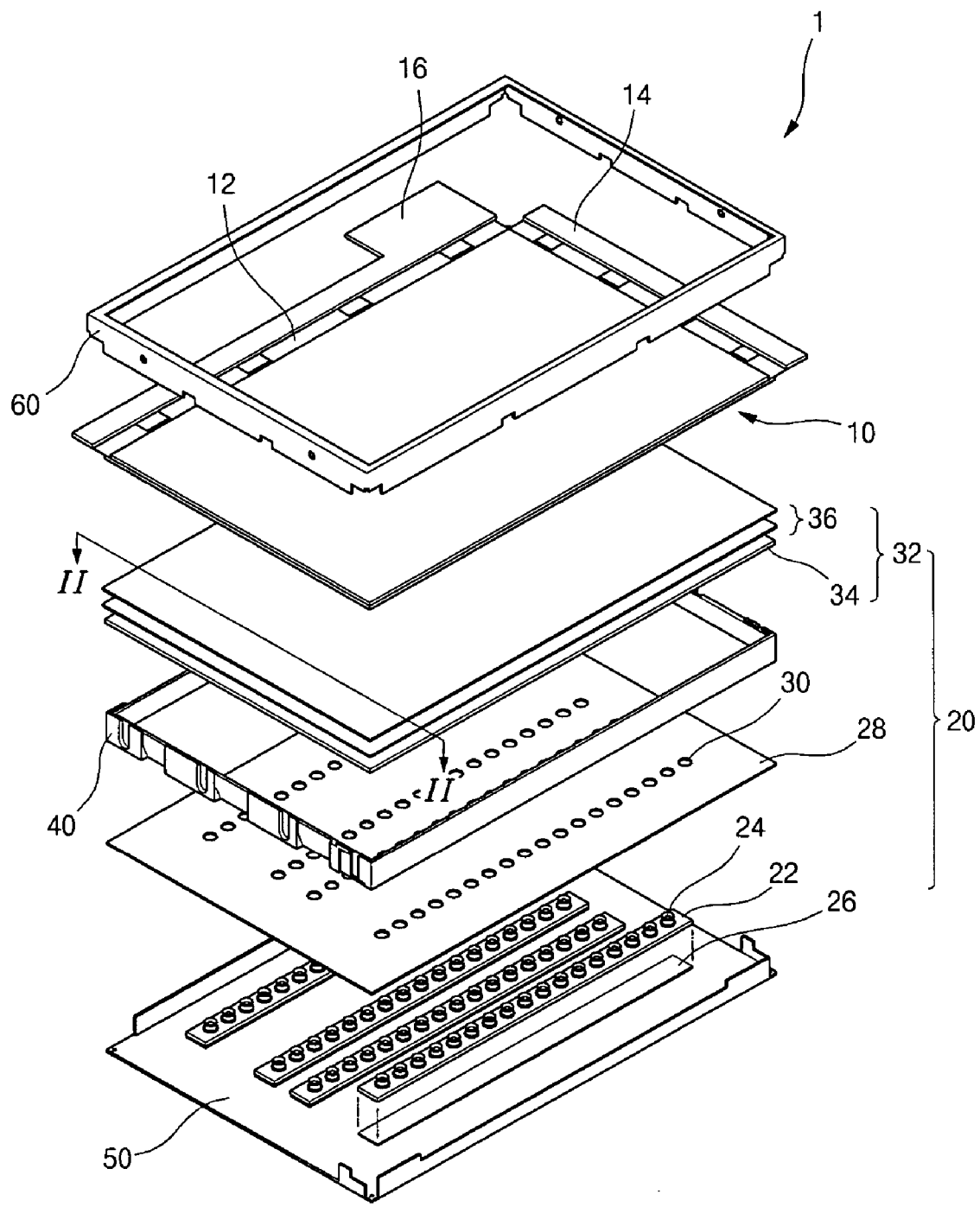
FIG. 1 is an exploded view of an LCD module using an LED according to the related art.
Figure 2:
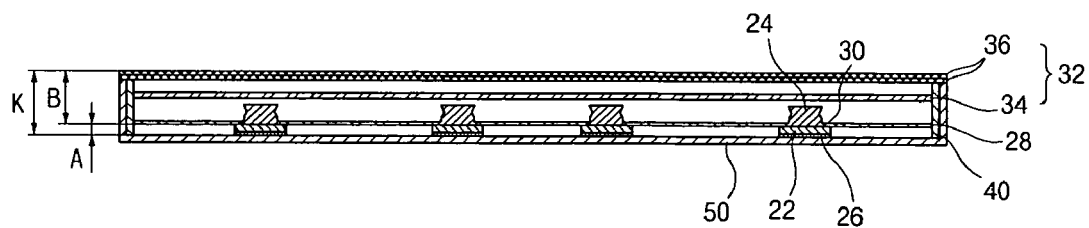
FIG. 2 is a cross-sectional view taken along a line II-II of FIG. 1.
Figure 3:
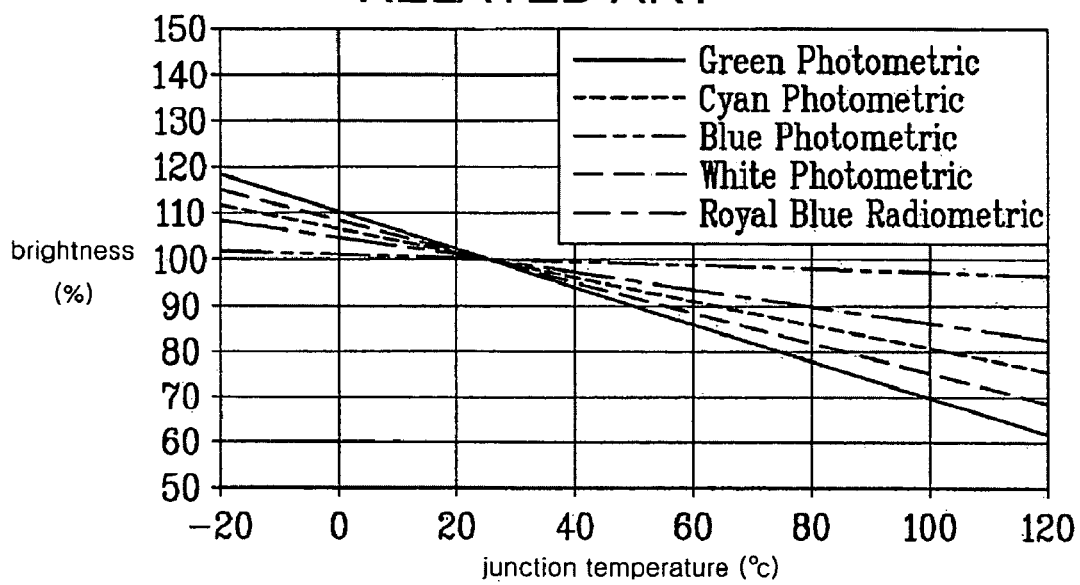
FIG. 3 is a graph illustrating the relationship between a brightness relationship between a junction temperature of an LED and the brightness of the LED according to the related art.
Figure 4:
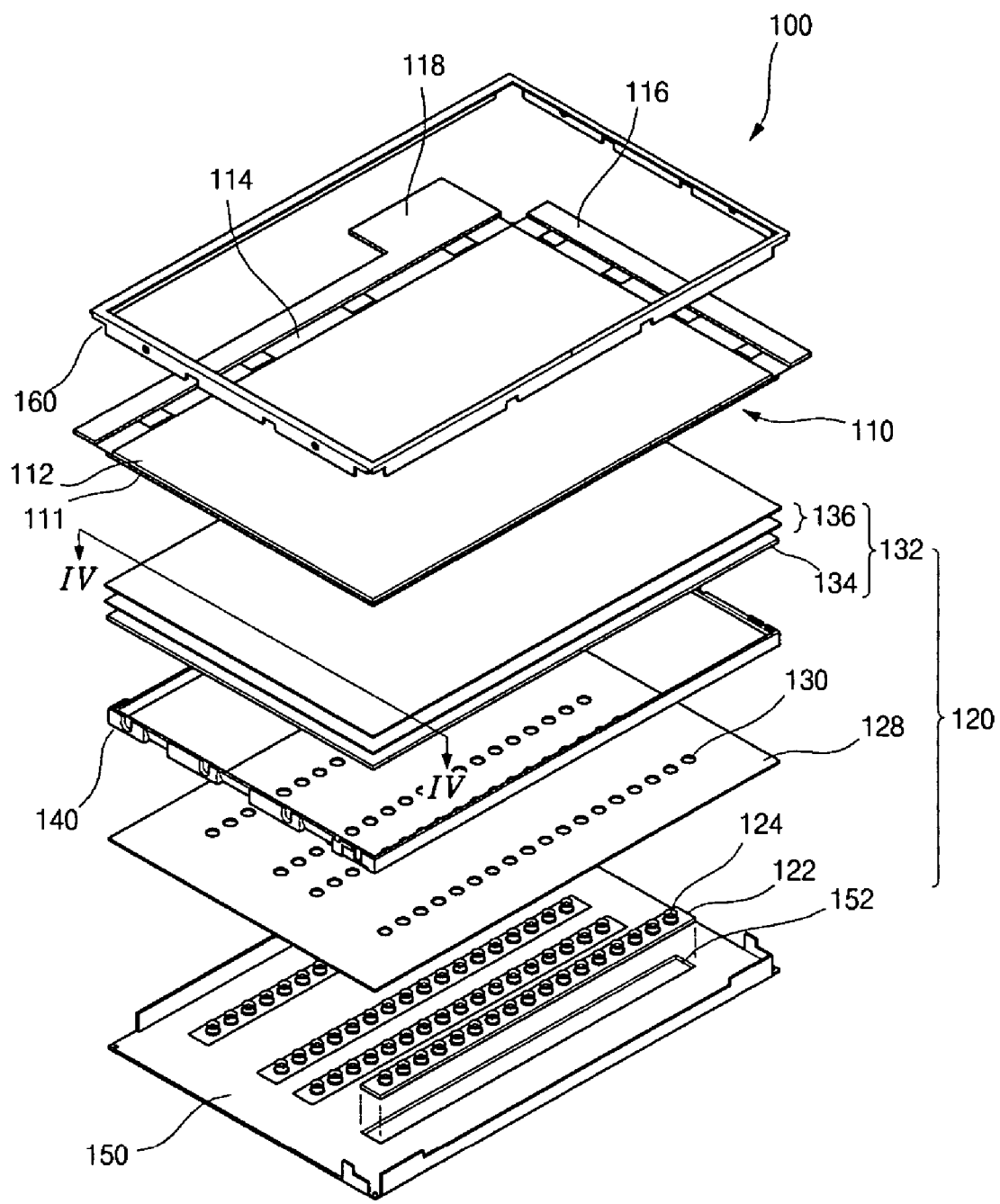
FIG. 4 is an exploded view of an LCD module with an LED according to the present invention.

As shown in FIG. 4, an LCD module 100 includes a LCD panel 110, a backlight unit 120 that is disposed under the LCD panel 110, a main support bracket 140 that surrounds an edge of the LCD panel 110, a top cover 160 that surrounds a front edge of the LCD panel 110, and a bottom cover 150 that surrounds a back edge of the backlight unit 120. The main support bracket 140, the top cover 160, and the bottom cover 150 are assembled to each other to form the LCD module 100.

The LCD panel 110 includes a first substrate 111, a second substrate 112 facing the first substrate, and a liquid crystal layer (not shown) between the first and the second substrates 111, 112. The first substrate 111 includes a gate line (not shown), a data line (not shown) crossing the gate line to define a pixel region, a thin film transistor (not shown) near a crossing of the gate and the data lines, with the pixel electrode being connected to the thin film transistor in the pixel region.

The second substrate 112 includes a black matrix (not shown) corresponding to a non-pixel region in a periphery of the pixel region, a color filter layer (not shown) on the black matrix in the pixel region, and a common electrode (not shown) on the color filter layer.

Additionally, first and second driving circuit boards 116, 118 are disposed along an edge of the LCD panel 110 on a flexible printed circuit board 114. In some embodiments, the first and second driving circuit boards 116, 118 are bent toward a backside of the bottom cover 150. In operation, the first and second driving circuit boards 116, 118 may apply a gate signal to the gate line and a data signal to the data line, respectively.

In operation, a selected thin film transistor formed by the respective gate lines and receiving ON/OFF signal voltages from the first driving circuit 116. When the thin film transistor receives an ON voltage, the data signal of the second driving circuit 118 is applied to the respective pixel electrodes through the respective data lines. Therefore, an arrangement direction of the liquid crystal molecule by the vertical electric field between the pixel electrode and the common electrode is changed, so transmittance difference occurs between ON state and OFF state.

A printed circuit board 122 is positioned under the LCD panel 110, with an LED 124 is packaged on an inner surface of the printed circuit board 122. The bottom cover 150 further includes a recess portion 152 that provides space for the printed circuit board 122 and the LED 124 to be inserted thereon. A reflective sheet 128 covers inner surfaces of the printed circuit board 122 and the bottom cover 150, and an optical sheet 132 is interposed between the reflective sheet 128 and the LCD panel 110. In some embodiments, the optical sheet 132 may be formed from a plurality of sheets.

For example, the printed circuit board 122 includes a metal core type printed circuit board that provides protection against heat transfer and also provides for sufficient electric conductivity.

In operation, light that is emitted from the LED 124 is reflected directly or reflected by the reflective sheet 128. The light that passes through the plurality of optical sheets 132 enters the LCD panel 110. Because of the reflected light through the reflected sheet 128, the light entering the LCD panel 110 is brighter and more uniform than with embodiments without the reflected sheet 128. In some embodiments, the LED 124 may include red, green and blue LEDs 124 with the same numbers of each color and a sequential arrangement. In this embodiment, the red, green and blue LEDs may be simultaneously flickered, which presents a high purity white light.

Additionally, the main support bracket 140 may be formed from molded material such as polymer resin or a metallic material. A main feature of the bottom cover according to the present invention is explained in detail below.

Figure 5:
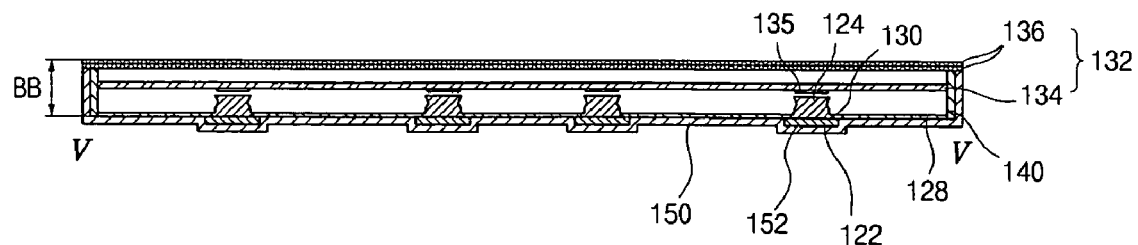
FIG. 5 is a cross-sectional view taken along a line V-V of FIG. 4 according to an embodiment of the present invention.

As shown in FIG. 5, a bottom cover 150 includes a recessed portion 152 that accepts the printed circuit board 122 and the LED 124. Specifically, one printed circuit board 122 includes a plurality of LEDs 124 arranged in a row therein, and a plurality of the printed circuit boards 124 are arranged in an inner surface of the bottom cover 150. In this embodiment, the depth of the recessed portion 152 of the bottom cover 150 is greater than or equal to a thickness of the printed circuit board 122, i.e., the printed circuit board 122 may be fully inserted into the recessed portion of the bottom cover 150.

The reflective sheet 128 includes a plurality of open portions 130 that correspond to the LEDs 124 such that the reflective sheet 128 covers the entire printed circuit board 122 and the inner surface of the bottom cover 150, but leaves the LED 124 uncovered. A plurality of optical sheets 132 are interposed between the reflective sheet 128 and the LCD panel 110.

The optical sheets 132 contact the LEDs 124 that are exposed by the open portions 130 of the reflective sheet 128. The optical sheet 132 additionally includes a diffusion sheet 134 positioned between the LEDs 124 and the LCD panel 110, and a plurality of prism sheets 136 that are interposed between the diffusion sheet 134 and the LCD panel 110. In this embodiment, the diffusion sheet 134 converts point light generated by the LED 124 into planar light. In operation, a diffusion dot of a reflective material is adhered to polymethyl metahcrylate (PMMA) plate that has a predetermined thickness, and straight light from the LED 124 can be diffused outside as a planar light.

The diffusion sheet 134 may have a space between the LED 124 and a prism sheet 136 in order to have an effect of light scattering.

The prism sheet 136 includes a plurality of sheets that have a different radius of curvature for each respective prism, and then diffused light capable of modifying the light as a high quality light from this diffusion sheet 134 is transmitted to the LCD panel 110 can modify.

The LCD module 100 using the LED 124 has a characteristic that the printed circuit board 122 is inserted in the recessed portion of the bottom cover 150 and the reflective sheet 128 closely adhered to the inner surface of the bottom cover 150, wherein a first distance BB from the inner surface of the bottom cover 150 to an outer surface of the outermost prism sheet 136 toward the LCD panel 110 includes a thickness of the reflective sheet 128 having a constant value due to an optical property, a distance from the outer surface of the reflective sheet 128 to the inner surface of the diffusion sheet 134, a thickness of the diffusion sheet 134, a distance from the outer surface of the diffusion sheet 134 to the outer surface of the approximate prism sheet 128. However, the first distance BB does not include a distance between the bottom cover 150 and the reflective sheet 128. Consequently, a height of the main support bracket 140 can be significantly reduced by these reasons.

Accordingly, the method of forming the recess portion 152 in the bottom cover 150 of the LCD module 100 according to the present invention may include several embodiments, wherein the recess portion 152 is formed by cutting a portion of an inner surface of the bottom cover 150 in case that the thickness of the cover bottom 150 is bigger than that of the printed circuit board 122 as shown in FIG. 5. Therefore, a first portion having the recess portion 152 and a second portion adjacent to the first portion have a different thickness from each other.

Figure 6:
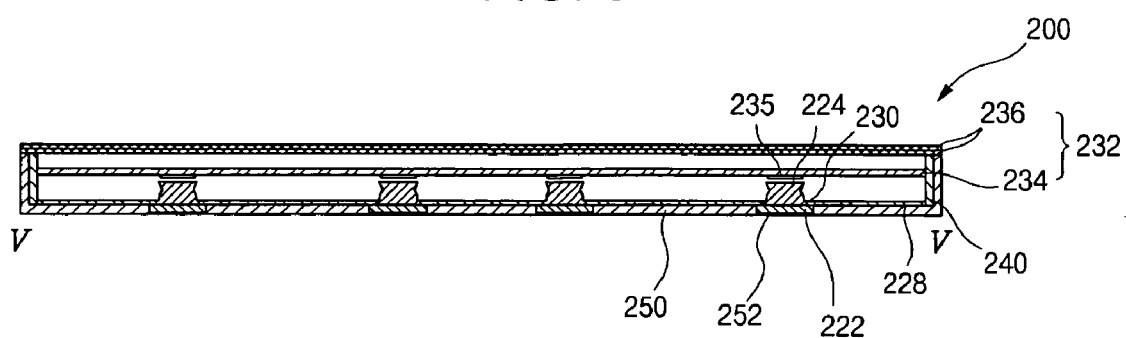
FIG. 6 is a cross-sectional view taken along a line V-V of FIG. 4 according to another embodiment of the present invention.

FIG. 6, provides an embodiment where the thickness of the bottom cover 250 is equal to or less than that of the printed circuit board 222, and the portion of the bottom cover 250 corresponding to the recess portion 252 is formed so that the portion of the bottom cover 250 is projected. The first portion having the recess portion 252 and the second portion adjacent to the first portion have a uniform thickness with each other, but the bottom cover 250 has an indented surface.

The LCD module 200 using the LED 224 according to the present invention provides a reduced thickness model and a thin and a slim mode corresponding to a customers demand.

Furthermore, the printed circuit board 222 is fixed by being tightly inserted into the inner surface of the bottom cover 250 instead of using additional fixed member, such as a conductive adhesion member or a screw, to fix the printed circuit board 222 in the inner surface of the bottom cover 250. This significantly reduces the time and effort required for its assembly and disassembly.

In addition, because at least three surfaces of the printed circuit board 222 are closely adhered to the bottom cover 250, it is possible to protect against heat more effectively. Therefore, the lifetime of the LED 224 is be extended and its brightness can be accordingly increased.

It will be apparent to those skilled in the art that various modifications and variations can be made in a liquid crystal display device of the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
   (a) a liquid crystal display panel;
   (b) a support bracket surrounding an edge of the liquid crystal display panel;
   (c) a flat printed circuit board positioned under the liquid crystal display panel, the flat printed circuit board having side and back surfaces;
   (d) a light emitting diode positioned on a planar inner surface of the flat printed circuit board;
   (e) a bottom cover positioned under the flat printed circuit board, the bottom cover including a recessed portion in which the flat printed circuit board including the light emitting diode is inserted, the recessed portion exposing only the planar inner surface of the flat printed circuit board and the light emitting diode, wherein the recessed portion is formed at an inner surface of the bottom cover, and wherein the recessed portion is spaced apart from an outer line of bottom cover; and (f) a top cover surrounding a front edge of the liquid crystal display panel, the top cover, the support bracket and the bottom cover, wherein the side and back surfaces of the flat printed circuit board contact the bottom cover.

2. The device according to claim 1, further comprising:

(g) a flat reflective sheet contacting and covering both the planar inner surface of the flat printed circuit board and a portion of the inner surface of the bottom cover directly adjacent to the planar inner surface of the flat printed circuit board and spaced apart from an outer line of the bottom cover, the flat reflective sheet having an open portion corresponding to the recessed portion; and (h) an optical sheet interposed between the flat reflective sheet and the liquid crystal display panel.

3. The device according to claim 2, wherein the optical sheet contacts the light emitting diode that is exposed by the open portion of the flat reflective sheet.

4. The device according to claim 1, wherein the flat printed circuit board further comprises a metal core.

5. The device according to claim 1, wherein the flat printed circuit board is inserted in the recessed portion without forming any substantial gaps.

6. The device according to claim 1, wherein a depth of the recessed portion is larger than a thickness of the flat printed circuit board.

7. The device according to claim 1, wherein a depth of the recessed portion is equal to a thickness of the flat printed circuit board.

8. The device according to claim 7, wherein a portion of an outer surface of the bottom cover that corresponds to the recessed portion is projected from the bottom cover.

9. The device according to claim 8, wherein the bottom cover is formed of as a united body with the portion of the outer surface of the bottom cover.

10. The device according to claim 1, wherein the light emitting diode and a second adjacent light emitting diode are arranged in a row along a length direction of the flat printed circuit board.

11. A liquid crystal display device, comprising:

(a) a liquid crystal display panel;

(b) a flat printed circuit board with at least a bottom side surface and at least two side surfaces positioned under the liquid crystal display panel;

(c) a light emitting diode positioned on an inner surface of the flat printed circuit board;

(d) a bottom cover positioned under the flat printed circuit board including a recessed portion under the flat printed circuit board in which the bottom side surface and the two side surfaces of the flat printed circuit board contact the bottom cover, wherein the recessed portion is formed at an inner surface of the bottom cover, wherein the recess portion is spaced apart from an outer line of bottom cover and wherein the at least bottom surface and the at least two side surfaces of the flat printed circuit board contact the bottom cover and the recessed portion exposing only the planar inner surface of the flat printed circuit board and the light emitting diode, and (e) a flat reflective sheet contacting and covering both a portion of the planar inner surface of the flat printed circuit board and a portion of the inner surface of bottom cover directly adjacent to and surrounding to the recessed portion.

12. The liquid crystal display device of claim 11 wherein the flat reflective sheet has an open portion corresponding to the recessed portion which exposes the light emitting diode.

13. The liquid crystal display device of claim 12 further comprising an optical sheet interposed between the flat reflective sheet and the liquid crystal display panel.

14. The liquid crystal display device of claim 13 wherein the optical sheet contacts the light emitting diode that is exposed by the open portion of the reflective sheet.

15. The liquid crystal display device of claim 11 wherein the printed circuit board further comprises a metal core.

16. The liquid crystal display device of claim 11, wherein the printed circuit board is inserted in the recessed portion without forming any substantial gaps.

17. The liquid crystal display device of claim 11, wherein a depth of the recessed portion is greater than a thickness of the printed circuit board.

18. The liquid crystal display device of claim 11 wherein a depth of the recessed portion is equal to a thickness of the printed circuit board.

19. The liquid crystal display device of claim 18 wherein a portion of an outer surface of the bottom cover that corresponds to the recessed portion is projected downwardly from the bottom cover.

20. The liquid crystal display device of claim 11 wherein the light emitting diode and a second adjacent light emitting diode are arranged in a row along a length direction of the printed circuit board.

* * * * *